United States Patent
Paranjpe

(10) Patent No.: US 12,062,068 B2
(45) Date of Patent: Aug. 13, 2024

(54) ONEAPP SYSTEM AND METHOD

(71) Applicant: MARGO NETWORKS PVT. LTD., Mumbai (IN)

(72) Inventor: Rohit Paranjpe, Mumbai (IN)

(73) Assignee: MARGO NETWORKS PVT. LTD. (IN)

( * ) Notice: Subject to any disclaimer, the term of this patent is extended or adjusted under 35 U.S.C. 154(b) by 0 days.

(21) Appl. No.: 17/735,974

(22) Filed: May 3, 2022

(65) Prior Publication Data

US 2022/0358542 A1 Nov. 10, 2022

(51) Int. Cl.
G06Q 30/00 (2023.01)
G06Q 30/0251 (2023.01)
G05B 19/418 (2006.01)

(52) U.S. Cl.
CPC ..... *G06Q 30/0261* (2013.01); *G06Q 30/0267* (2013.01)

(58) Field of Classification Search
None
See application file for complete search history.

(56) References Cited

U.S. PATENT DOCUMENTS

| | | |
|---|---|---|
| 7,127,713 B2 | 10/2006 | Davis |
| 7,307,956 B2 | 12/2007 | Kaplan et al. |
| 7,395,355 B2 | 7/2008 | Afergan et al. |
| 7,505,944 B2 | 3/2009 | Moulart et al. |
| 7,752,258 B2 | 7/2010 | Lewin et al. |
| 7,860,950 B2 | 12/2010 | Menon et al. |
| 7,921,259 B2 | 4/2011 | Elazary et al. |
| 8,375,456 B2 | 2/2013 | Li et al. |
| 8,516,529 B2 | 8/2013 | LaJoie et al. |
| 8,737,357 B2 | 5/2014 | Denny et al. |
| 8,746,553 B2 | 6/2014 | Burdett |
| 8,838,480 B2 | 9/2014 | Damola et al. |
| 8,843,758 B2 | 9/2014 | Dharmarajan et al. |
| 8,937,903 B2 | 1/2015 | Bari et al. |
| 9,001,682 B2 | 4/2015 | Kovvali et al. |
| 9,003,436 B2 | 4/2015 | Tidwell et al. |
| 9,105,021 B2 | 8/2015 | Tobin |
| 9,173,158 B2 | 10/2015 | Varma |
| 9,282,352 B2 | 3/2016 | McDysan et al. |
| 9,367,857 B2 | 6/2016 | Linden et al. |

(Continued)

FOREIGN PATENT DOCUMENTS

| | | |
|---|---|---|
| CN | 101741869 B | 4/2013 |
| CN | 103782571 A | 5/2014 |

(Continued)

OTHER PUBLICATIONS

US 8,782,123 B2, 07/2014, Seed et al. (withdrawn)

(Continued)

*Primary Examiner* — Maria V Vanderhorst
(74) *Attorney, Agent, or Firm* — Manatt, Phelps & Phillip

(57) ABSTRACT

A OneAPP platform system and method provide hyperlocal searching. Each computing device has a OneApp that identifies a user action on the computing device that indicates an interest in a point of interest (PoI) and transform, in response to the user action on the computing device, the OneApp stored on the computing device into a PoI specific App that delivers PoI specific content and offers to the computing device.

22 Claims, 12 Drawing Sheets

(56) References Cited

U.S. PATENT DOCUMENTS

| | | |
|---|---|---|
| 9,374,619 B2 | 6/2016 | Andreasen et al. |
| 9,419,845 B2 | 8/2016 | Wainner et al. |
| 9,497,496 B1 | 11/2016 | Corley et al. |
| 9,565,117 B2 | 2/2017 | Dahod et al. |
| 9,584,598 B2 | 2/2017 | Phillips et al. |
| 9,613,190 B2 | 4/2017 | Ford et al. |
| 9,661,374 B1 | 5/2017 | Erdmann et al. |
| 9,674,239 B2 | 6/2017 | Wong et al. |
| 9,871,850 B1 | 1/2018 | Brandwine et al. |
| 9,875,493 B2 | 1/2018 | Nuzzi |
| 9,904,934 B1 | 2/2018 | Kumar et al. |
| 9,911,154 B2 | 3/2018 | Baker et al. |
| 10,009,741 B1 | 6/2018 | Burcham et al. |
| 10,019,724 B2 | 7/2018 | Patel |
| 10,045,070 B2 | 8/2018 | Markley et al. |
| 10,049,349 B1 | 8/2018 | Grassadonia et al. |
| 10,055,721 B1 | 8/2018 | Mocko et al. |
| 10,097,503 B2 | 10/2018 | Bergman |
| 10,110,710 B2 | 10/2018 | Cook et al. |
| 10,134,026 B1 | 11/2018 | Koeppel |
| 10,142,444 B2 | 11/2018 | Reynolds et al. |
| 10,200,480 B2 | 2/2019 | Zhang et al. |
| 10,248,975 B2 | 4/2019 | Garcia-Martinez et al. |
| 10,470,060 B1 | 11/2019 | Paranjpe et al. |
| 10,496,979 B2 | 12/2019 | Taveau et al. |
| 10,554,748 B2 | 2/2020 | Sivasubramanian et al. |
| 10,630,769 B2 | 4/2020 | Carver et al. |
| 10,693,813 B1 | 6/2020 | Jacob Da Silva et al. |
| 10,715,411 B1 | 7/2020 | Jacob Da Silva et al. |
| 10,878,404 B2 | 12/2020 | Lu et al. |
| 10,931,778 B2 | 2/2021 | Paranjpe et al. |
| 2001/0023180 A1 | 9/2001 | Sauer |
| 2002/0023002 A1 | 2/2002 | Staehelin |
| 2002/0143798 A1 | 10/2002 | Lisiecki et al. |
| 2002/0194171 A1 | 12/2002 | Judd et al. |
| 2004/0093419 A1 | 5/2004 | Weihl et al. |
| 2004/0205162 A1 | 10/2004 | Parikh |
| 2004/0232221 A1 | 11/2004 | Beenau |
| 2005/0021462 A1 | 1/2005 | Teague et al. |
| 2005/0027543 A1 | 2/2005 | Labrou |
| 2005/0177624 A1 | 8/2005 | Oswald |
| 2006/0036493 A1 | 2/2006 | Aufricht et al. |
| 2006/0242069 A1 | 10/2006 | Peterka |
| 2007/0094691 A1 | 4/2007 | Gazdzinski |
| 2007/0106626 A1 | 5/2007 | Mundie et al. |
| 2007/0124662 A1 | 5/2007 | Streuter et al. |
| 2007/0226365 A1 | 9/2007 | Hildreth |
| 2007/0255617 A1 | 11/2007 | Maurone et al. |
| 2008/0006685 A1 | 1/2008 | Rackley, III |
| 2008/0010191 A1 | 1/2008 | Rackley, III |
| 2008/0010192 A1 | 1/2008 | Rackley, III |
| 2008/0049630 A1 | 2/2008 | Kozisek et al. |
| 2008/0102947 A1 | 5/2008 | Hays et al. |
| 2008/0162589 A1 | 7/2008 | Rodeheffer et al. |
| 2008/0107264 A1 | 8/2008 | Van Wie et al. |
| 2008/0215747 A1 | 9/2008 | Menon et al. |
| 2008/0222281 A1 | 9/2008 | Dilley et al. |
| 2008/0262941 A1 | 10/2008 | Feiner |
| 2009/0030765 A1 | 1/2009 | Cameron et al. |
| 2009/0094160 A1 | 4/2009 | Webster et al. |
| 2009/0132365 A1 | 5/2009 | Gruenhagen et al. |
| 2009/0132395 A1 | 5/2009 | Lam et al. |
| 2009/0157537 A1 | 6/2009 | Miller |
| 2009/0164286 A1 | 6/2009 | Gupta et al. |
| 2009/0164326 A1 | 6/2009 | Bishop |
| 2009/0164329 A1 | 6/2009 | Bishop |
| 2009/0164330 A1 | 6/2009 | Bishop |
| 2009/0254661 A1 | 10/2009 | Fullagar et al. |
| 2009/0287515 A1 | 11/2009 | Mehta et al. |
| 2009/0323693 A1 | 12/2009 | Yin et al. |
| 2010/0074267 A1 | 3/2010 | Ladd |
| 2010/0121715 A1 | 5/2010 | Shiojinna |
| 2011/0078079 A1 | 3/2011 | Shin |
| 2011/0082724 A1 | 4/2011 | Le Chevalier et al. |
| 2011/0087602 A1 | 4/2011 | Rutman |
| 2011/0161462 A1 | 6/2011 | Hussain et al. |
| 2011/0314145 A1 | 12/2011 | Raleigh et al. |
| 2012/0054837 A1 | 3/2012 | Yoon |
| 2012/0096106 A1 | 4/2012 | Blumofe et al. |
| 2012/0166618 A1 | 6/2012 | Dahod et al. |
| 2012/0215915 A1 | 8/2012 | Sakata et al. |
| 2012/0231844 A1 | 9/2012 | Coppinger |
| 2012/0284256 A1* | 11/2012 | Mahajan ............ G06F 16/9537 707/E17.014 |
| 2012/0330769 A1 | 12/2012 | Arceo |
| 2013/0013688 A1 | 1/2013 | Wang et al. |
| 2013/0024363 A1 | 1/2013 | Cunescu et al. |
| 2013/0085864 A1 | 4/2013 | Ahmed et al. |
| 2013/0107732 A1 | 5/2013 | O'Donnell et al. |
| 2013/0110984 A1 | 5/2013 | Raciborski et al. |
| 2013/0132504 A1 | 5/2013 | Kohli et al. |
| 2013/0238503 A1 | 9/2013 | Patel |
| 2013/0346305 A1 | 12/2013 | Mendes |
| 2014/0082126 A1 | 3/2014 | Kim et al. |
| 2014/0094159 A1 | 4/2014 | Raleigh et al. |
| 2014/0095320 A1 | 4/2014 | Sivarannakrishnan et al. |
| 2014/0115606 A1 | 4/2014 | Hamzata et al. |
| 2014/0122198 A1 | 5/2014 | Cheung |
| 2014/0229277 A1 | 8/2014 | Khambete et al. |
| 2014/0279047 A1 | 9/2014 | Wang et al. |
| 2014/0282725 A1 | 9/2014 | Brandstetter |
| 2014/0373049 A1 | 12/2014 | Carr et al. |
| 2015/0143397 A1 | 5/2015 | Bies |
| 2015/0172135 A1 | 6/2015 | Coppola et al. |
| 2015/0189070 A1* | 7/2015 | Baker ................ G06F 16/9537 715/738 |
| 2015/0237512 A1 | 8/2015 | Chang et al. |
| 2015/0278796 A1 | 10/2015 | Jiang et al. |
| 2015/0302181 A1 | 10/2015 | Fahn |
| 2015/0310421 A1 | 10/2015 | Xie |
| 2015/0319214 A1 | 11/2015 | Yu |
| 2015/0339318 A1 | 11/2015 | O'Toole et al. |
| 2015/0339667 A1 | 11/2015 | Dua |
| 2015/0341705 A1 | 11/2015 | Rauhe et al. |
| 2015/0350018 A1 | 12/2015 | Hui et al. |
| 2015/0371215 A1 | 12/2015 | Zhou |
| 2016/0034876 A1 | 2/2016 | Speiser |
| 2016/0042344 A1 | 2/2016 | Thimmana et al. |
| 2016/0011718 A1 | 4/2016 | Jajara |
| 2016/0191651 A1 | 6/2016 | Balakrishnan et al. |
| 2016/0210622 A1 | 7/2016 | Yang et al. |
| 2016/0248879 A1 | 8/2016 | Fliam et al. |
| 2016/0300272 A1 | 10/2016 | Ao et al. |
| 2016/0328740 A1 | 11/2016 | Chan et al. |
| 2016/0337206 A1 | 11/2016 | Bugenhagen et al. |
| 2016/0371716 A1 | 12/2016 | Aitenbichler |
| 2017/0032345 A1 | 2/2017 | Gideon et al. |
| 2017/0083877 A1 | 3/2017 | Dix |
| 2017/0142024 A1 | 5/2017 | Fromentoux et al. |
| 2017/0155739 A1 | 6/2017 | Ao |
| 2017/0178090 A1 | 6/2017 | Sarin |
| 2017/0187837 A1 | 6/2017 | Ao |
| 2017/0223029 A1 | 8/2017 | Sharma et al. |
| 2017/0228766 A1 | 8/2017 | Mahajan |
| 2017/0255924 A1 | 9/2017 | White |
| 2017/0262902 A1 | 9/2017 | Weston et al. |
| 2018/0048700 A1 | 2/2018 | Gummadi |
| 2018/0068290 A1 | 3/2018 | Xia |
| 2018/0068293 A1 | 3/2018 | Dunne |
| 2018/0077258 A1 | 3/2018 | Newton et al. |
| 2018/0124143 A1 | 5/2018 | Bologh |
| 2018/0124646 A1 | 5/2018 | Thubert et al. |
| 2018/0184132 A1 | 6/2018 | Mao |
| 2018/0184477 A1 | 6/2018 | Paredes et al. |
| 2018/0232732 A1 | 8/2018 | Rodrigues et al. |
| 2018/0310279 A1 | 10/2018 | Pathak et al. |
| 2018/0317067 A1 | 11/2018 | Ameixieira |
| 2019/0028743 A1 | 1/2019 | He et al. |
| 2019/0069003 A1 | 2/2019 | Panagos et al. |
| 2019/0114631 A1 | 4/2019 | Madhu et al. |
| 2019/0122202 A1 | 4/2019 | Sun |
| 2019/0130386 A1 | 5/2019 | Bhat |
| 2019/0139029 A1 | 5/2019 | Kadiwala |
| 2019/0141561 A1 | 5/2019 | Altay et al. |

(56) References Cited

U.S. PATENT DOCUMENTS

| | | | |
|---|---|---|---|
| 2019/0166395 | A1 | 5/2019 | Li |
| 2019/0197539 | A1 | 6/2019 | Chang |
| 2019/0268392 | A1 | 8/2019 | Santangelo et al. |
| 2019/0274082 | A1 | 9/2019 | Vemuri et al. |
| 2019/0289059 | A1 | 9/2019 | Vanahallli et al. |
| 2020/0034172 | A1 | 1/2020 | Wu et al. |
| 2020/0082404 | A1 | 3/2020 | Zhang et al. |
| 2020/0126062 | A1 | 4/2020 | Sun |
| 2020/0153932 | A1 | 5/2020 | Bao et al. |
| 2020/0167742 | A1 | 5/2020 | Zhai et al. |
| 2020/0167746 | A1 | 5/2020 | Yu et al. |
| 2020/0220942 | A1 | 7/2020 | Paranjpe et al. |
| 2020/0221365 | A1 | 7/2020 | Paranjpe et al. |
| 2020/0242616 | A1 | 7/2020 | Waughtal |
| 2020/0242626 | A1 | 7/2020 | Agarwal et al. |
| 2020/0250644 | A1 | 8/2020 | Oberholtzer |
| 2021/0065174 | A1 | 3/2021 | Singh |
| 2021/0097521 | A1 | 4/2021 | Kumar |
| 2021/0103910 | A1 | 4/2021 | Subramaniam |
| 2021/0243072 | A1 | 8/2021 | Peterson |
| 2021/0289039 | A1 | 9/2021 | Paranjpe et al. |
| 2022/0020016 | A1 | 1/2022 | Scott |
| 2022/0224594 | A1 | 7/2022 | Peterson |

FOREIGN PATENT DOCUMENTS

| | | |
|---|---|---|
| CN | 106790552 A | 5/2017 |
| CN | 107852609 A | 3/2018 |
| CN | 107645475 B | 12/2019 |
| EP | 2815541 A1 | 12/2014 |
| EP | 3382975 A1 | 10/2018 |
| EP | 3 557 843 A1 | 10/2019 |
| IN | 201921000982 A | 1/2020 |
| KR | 100572478 B1 | 12/2006 |
| KR | 20070067005 A | 6/2007 |
| KR | 20130102792 A | 9/2013 |
| KR | 101574074 B1 | 12/2015 |
| WO | WO2006133655 A1 | 12/2006 |
| WO | WO2008022339 A2 | 2/2008 |
| WO | WO2009101600 A1 | 8/2009 |
| WO | WO2012000438 A1 | 1/2012 |
| WO | WO2012131287 A1 | 10/2012 |
| WO | WO2013052028 A2 | 4/2013 |
| WO | WO2013123162 A1 | 8/2013 |
| WO | WO2013170864 A1 | 11/2013 |
| WO | WO2015090360 A1 | 6/2015 |
| WO | WO2015181591 | 12/2015 |
| WO | WO2016043839 A1 | 3/2016 |
| WO | WO2018027984 A1 | 2/2018 |
| WO | WO2018158729 A1 | 4/2018 |
| WO | WO2018087275 A1 | 5/2018 |
| WO | WO2018215681 A1 | 11/2018 |
| WO | WO2019123273 A1 | 6/2019 |
| WO | WO2019213169 A1 | 11/2019 |
| WO | WO2020144701 A1 | 7/2020 |

OTHER PUBLICATIONS

"Towards a Framework for Proximity-Based Hybrid Mobile Applications". IEEE. 2018. (Year: 2018).*
"Designing Platform Independent Mobile Apps and Services". IEEE. 2016 (Year: 2016).*
Khan et al., "CAMEO:A Middleware for Mobile Advertisement Delivery," Network Architecture and Design:Wireless Communication, Research performed by author as a Research Fellow at Singapore Management University, Jun. 25-28, 2013, 13 pages.
Toubiana et al., "Adnostic: Privacy Preserving Targeted Advertising," NYU.edu and stanford.edu, supported by the NSF Portia and Muri Presidio projects, 23 pages.
Adi et al., "Secured Multi-Identity Mobile Infrastructure and Offline Mobile-Assisted Micro-Payment Application," WCNC 2004 / IEEE Communications Society, 4 pages.
Kiran et al., "Building Robust m-Commerce Payment System on Offline Wireless Network," Dept of Electronics & Communication Eng. Sai Vidya Institute of Technology and Electronics & Communication Eng. UVCE 3 pages.
Van Damme et al., "Offline NFC Payments with Electronic Vouchers," Dept. Electrical Engineering—ESAT/SCD/IBBT-COSIC, Katholieke Universiteit Leuven, Kasteelpark Arenberg 10, 3001 Heverlee-Leuven, Belgium, MobiHeld'09, Aug. 17, 2009, Barcelona, Spain, 6 pages.
Wikipedia, the Free Encyclopedia, Distributed Computing, Internet Archive WayBack Machine Capture date of Dec. 10, 2013, Internet Archive WayBack Machine (Year: 2013), 11 pages.
Mu, Su. "Application networking for pervasive content delivery." (2008). https://core.ac.uk/download/pdf/48630854.pdf. Disclosing CDN Components with a Network (Fig 2.2, p. 16 with Section "2.4.1 Open Pluggable Edge Service" from pp. 26-28).
Frangoudis, "An architecture for on-demand service deployment, over a telco CDN," IEEE ICC 2016 Next-Gen IRISA/University of Rennes 1, France, Aalto University, Finland, 6 pgs.
Frangoudis et al. "CDN-as-a-Service Provision over a Telecom Operator's Cloud," IEEE Transactions on Network and Service Management, IEEE, Dec. 9, 2017, 4(3), pp. 702-716, 16 pgs.
Griwodz et al. "Content Distribution Infrastructures," Jul. 2, 2004, Dagstuhl Seminar Proceedings 04201 http://drops.dagstuhl.de/opus/volltexte/2006/502, 6 pgs.
Hamzeh et al"Residential Network Architectures and Services," Cable Networks, Services, and Management, 1st Edition, 2015 Edited by Mehmet Toy, 372 pgs.
Huang, Shufeng, "A HyperNet Architecture" (2014), Theses and Dissertations-Computer Science. 18. https://uknowledge.uky.edu/cs_etds/18, 165 pgs.
Ravindran, "A Management Framework for Service Personalization," 2002, SOMA Networks Dept. of Electrical and Computer Engineering, Ryerson University, Toronto, Canada, 13 pgs.
Tyson, "A Topology Aware Clustering Mechanism" 2007, Computing Department Lancaster University, 6 pages.
Yala, "QoE-Aware Computing Resource Allocation for CDN-as-a-Service Provision" IRISA/University of Rennes 1, France, EURECOM Institute, Sophia Antipolis, France, 2016, 6 pgs.
Bhardwaj et al., "AppFlux: Taming App Delivery Streaming," Georgia Institute of Technology, pp. 1-14.
Kalva et al."Techniques for Improving the Capacity of Video-on Demand Systems," Proceeds of 29th Annual Hawaii International Conference on System Sciences, 1996, pp. 309-315.
Lai et al., "A Hierarchical Network Storage Architecture for Video-on-Demand Services," IEEE Transactions on Broadcasting, vol. 43:2, (Jun. 1997), pp. 145-154.
Little, T.D.C et al., "Prospects for Interactive Video-on-Demand," Multimedia Communications Laboratory, MCL Technical Report, (Feb. 15, 1994), pp. 1-22.
"How to Auto Switch between WiFi and Mobile the Smart Way," (Dec. 2018), 6 pages, Speedicyhttps://speedify.com/blog.
Kos et al., "CATV Broadband Technologies," EC-VIP-MC 2003, 4th EURASIP Conference, (2003), pp. 829-834.
Alloush et al., "Initial use cases, scenarios and requirements," CogNet, (Nov. 30, 2015), Ver. 0.9, pp. 1-107.
Velasco et al., "A Service-Oriented Hybrid Access Network and Cloud Architecture," pages 8.
Bulander et al., "Comparison of Different Approaches for Mobile Advertising," The Second IEEE International Workshop on Mobile Commerce and Services (WMCS '05) Jul. 19, 2005.
Callejo et al., "Opportunities and Challenges of Ad-based Measurements from the Edge of the Network," © 2017 Association for Computing Machinery. ACM ISBN 978-1-4503-5569.
Egorov, et al., "NuCypher KMS: Decentralized key management system" NuCypher and NICS Lab, Universidad de Malaga, Spain, Nov. 15, 2017, 21 pages.
Agile I.T., "Azure Rights Management" webpage, https://www.agileit.com/azure-rightsmanagement/, 9 pages.
Arkko, et al., "Mikey: Multimedia Internet KEYing", Network Working Group, Ericsson Research, Aug. 2004, 66 pages.

* cited by examiner

ONEAPP SYSTEM AND METHOD

FIELD

The disclosure relates generally to a system and method for providing users access to mobile applications based on user context.

BACKGROUND

When a person visits a store, the storekeeper or cashier often—at the time of entering the store or ordering at a restaurant or billing at a retail store—suggests downloading their mobile application (App) for availing benefits, such as personalized information, earning reward points on every spend, receiving early notifications for discounts and promotional offers, winning gift vouchers, obtaining valet parking, and similar other benefits. However, not many of those customers actually install the App and a large majority of the users that install, end up installing the App immediately after the first use. The primary reason for this is that users do not feel a strong enough urge to make the effort to download and install a new app on their phone as the use case or applicability of that App is so restricted (It is only applicable for that one brand or when a user visits that particular brand store).

By installing a store-specific app, customers would only stand to considerably gain if they become a regular to the store—and this realization may in itself be inhibiting due to the undertone of an implicit binding to the store. Also, if people start installing standalone apps for individual stores or brands, the number of apps on their phones can grow too high due to the numerous stores a person typically visits over time. Having too many apps cluttered on the phone is likely to be difficult to be managed, and can lead to not finding the right app at the right time. Thus, all these factors collectively reduce the propensity in customers to download and install store-specific apps.

The Google Play and Apple App stores have more than 2.87 million and 1.96 million apps, respectively, as of the third quarter of 2020. However, an Android and iOS user keeps only 50 and 80 apps installed on their phone on average, respectively. Out of these, the number of apps that they use at least once a month is reduced further to an average of 30. Out of these 30 active apps, users spend 96% of their time on the top 10 apps, while a staggering 77% is spent on the top three as shown in FIG. 1. The more alarming statistic is that 75% of all apps are used only once after installation, and never used again. Further, the apps for younger people are shown in FIG. 2 while the app categories are shown in FIG. 3.

All of the preceding data points toward the fact that the apps that are frequently used by consumers are ones that have a strong primary offering and a generic need in the life of the consumer—it is relevant to the user anytime, anywhere; which, in itself, is sufficient in terms of value proposition for the user to keep it on their device.

However, retail businesses, purely from the perspective of being physical store units or offering products or services that have a specific use case in the life of consumers, are doomed in this digital economy. If the consumption trend as illustrated in the previous section is extrapolated to the real world, the chance for mass-adoption of a store/brand's stand-alone app is negligible. Due to the specificity of their value proposition, these standalone apps do not really build a strong enough case or value proposition for themselves to justify a space in the digital real estate of a user's device. Out of the millions of retail businesses that exist, less than a handful of brands have managed to get any kind of consumer traction for their mobile apps. Apps of even large retail chains with multiple outlets belonging to hospitality, healthcare, retail, transport, education, and other industries have failed, as users prefer generic or aggregator apps over specific ones.

Armed with information on consumer behavior and consumption trends, app-economy businesses and aggregators can wipe out retail businesses. These apps and aggregators leverage their consumer insights to focus on the most profitable products and services. With economies of scale, they can offer products and services of higher and more tailored value at a lower price under private labels. They can, thereby, become not only fierce competitors of the retail businesses, but emerge to pose them an existential risk.

In the past, there are instances of apps that tried becoming multi-utility or super apps, but failed. Just Dial and Jio are two such examples. A few have succeeded, too. Examples of successful super apps are WeChat (instant messaging), Grab (ride-hailing), Meituan (food delivery), and PhonePe (payments). If a closer look is taken at the apps that succeeded, two common aspects emerge. These apps already had a strong value proposition and high mass adoption before they branched off to offer other utilities.

For example, WeChat is a super app that offers multiple utilities. Besides the core functionality of instant messaging, WeChat is used daily by the Chinese to buy goods and services, pay bills and carry out financial transactions, make bookings for various services, hail rides, search the Internet, avail public services like making hospital reservations, and a lot more. WeChat and other successful super-apps of today hadn't started off being super-apps, though. They were like conventional apps offering specialized utility to people, but became masters at their niche. By becoming very good at what they primarily do, they managed to develop a large user-base for themselves. Upon having a large user-base, they diversified. Having a ready customer base in place, ensures success. JustDial failed because it did not have a strong primary offering to hinge around for diversification. A large enough user-base was absent to premise its diversification on. These are problems that exist with apps and pose technical problems that limit their adoption.

Thus, it is desirable to provide a OneApp system and method that provides a technical solution to the above technical problems and it is to this end that the disclosure is directed.

DETAILED DESCRIPTION OF ONE OR MORE EMBODIMENTS

The disclosure is particularly applicable to a cloud based oneapp system and it is in this context that the disclosure will be described. It will be appreciated, however, that the oneapp system and method has greater utility since it may be implemented in other manners that are within the scope of the disclosure and may include other features that are also within the scope of the disclosure.

The OneApp system is primarily an Internet-enabler, which makes digital access faster, cheaper, and un-interruptive for anyone who has the app installed on their computing device, such as a phone. Besides this strong primary offering, OneApp has the potential to revolutionize the app ecosystem by becoming a single app that can function as any other app as discussed in more detail below. In one embodiment, the OneApp can transform itself into a different app based on the location of the user. For example, if a user is at a Starbucks® café, OneApp would start working as the Starbucks® app. When the user steps out and visits a departmental store, such as Walmart®, OneApp would convert itself into the Walmart® app. When the user enters a Marriott® property, it transforms into the Marriott® app. The benefit is that a user does not need to download and install individual apps for every brand and store since the single app works as a one size fits all. OneApp also functions as a discovery engine for other apps, Web-apps, brands, utilities, or any other point of interactions (PoI). FIGS. 7-11B that are discussed below show example user interfaces of the OneApp and how the OneApp transitions between different brands/apps.

Figure 1:
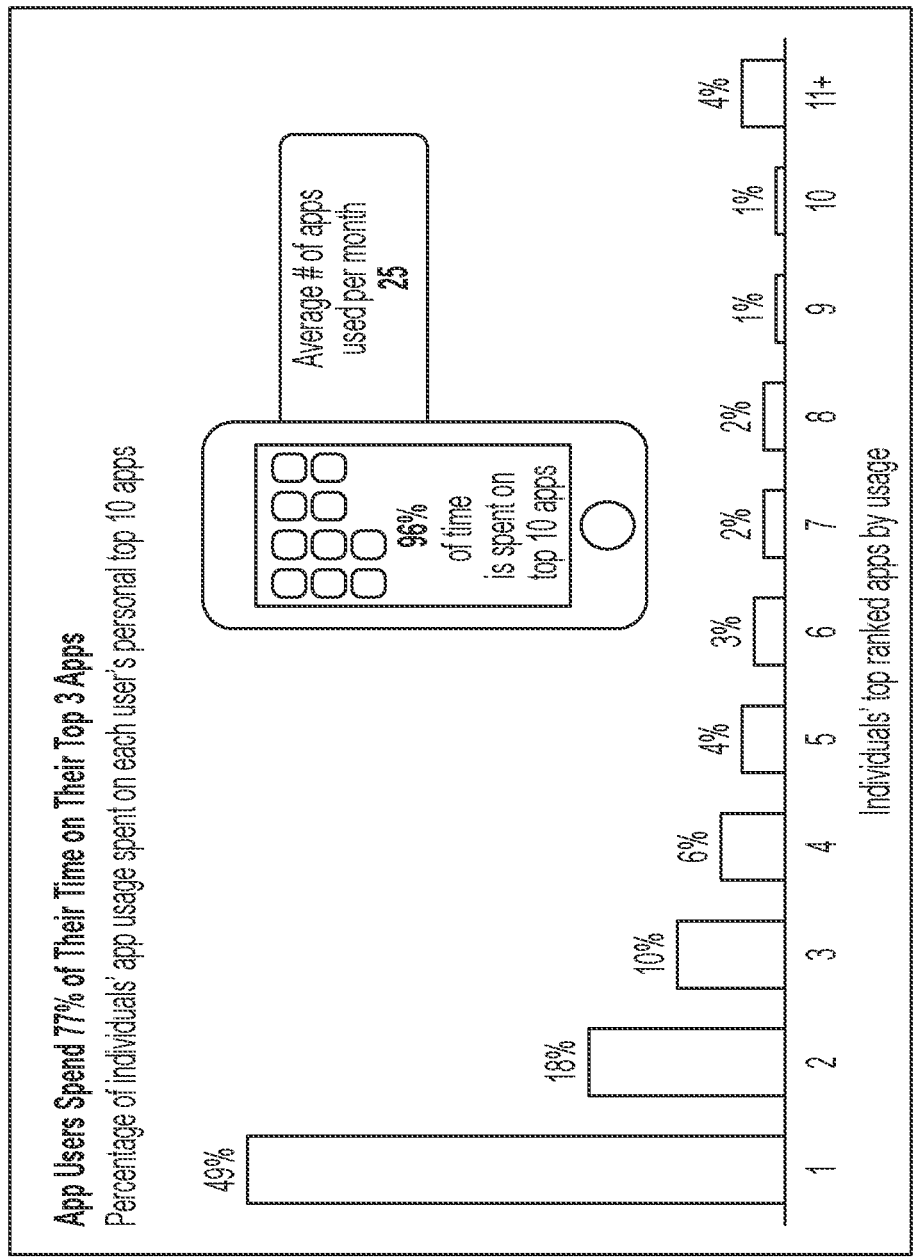
FIG. 1 shows app usage.
Figure 2:
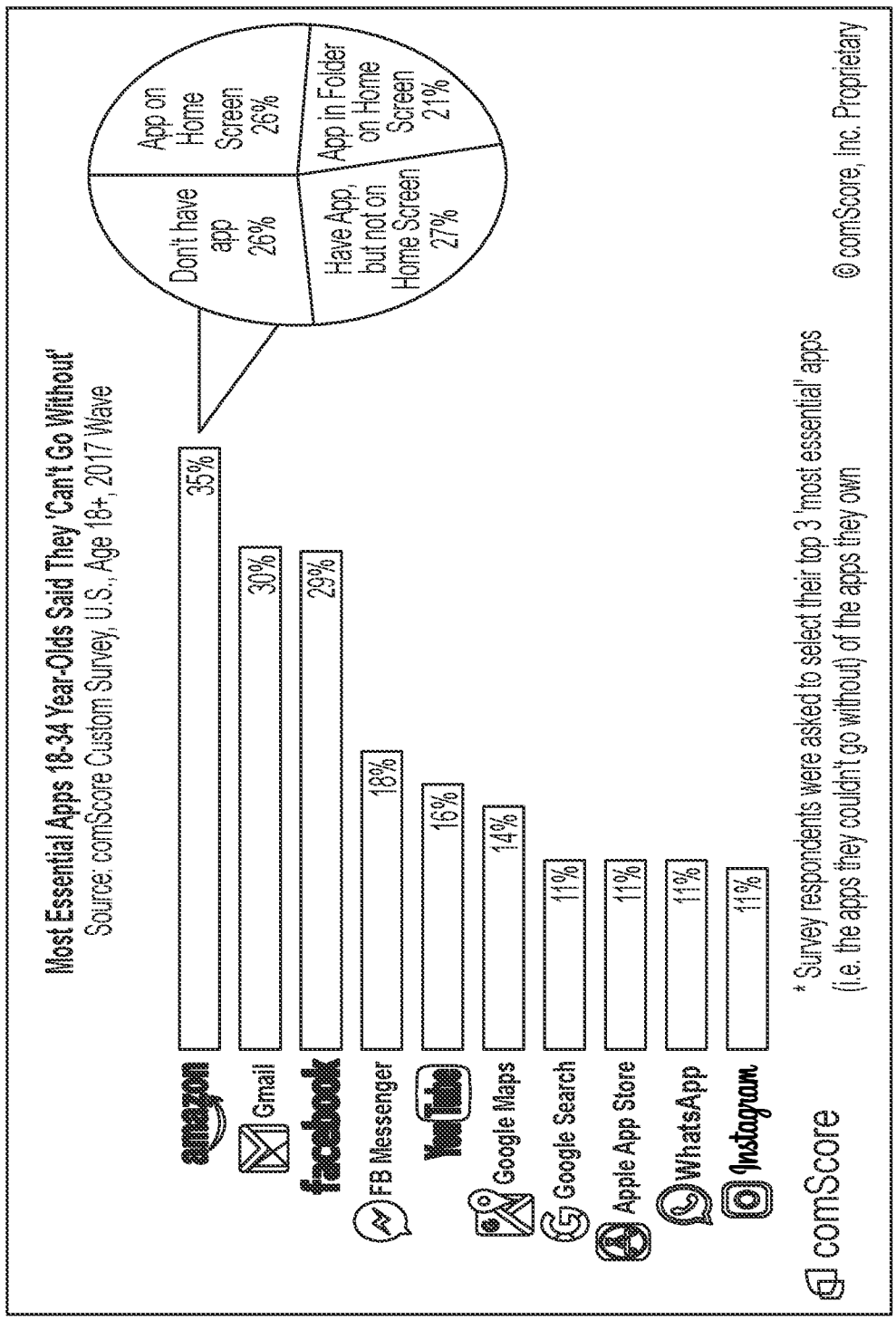
FIG. 2 shows essential apps.
Figure 3:
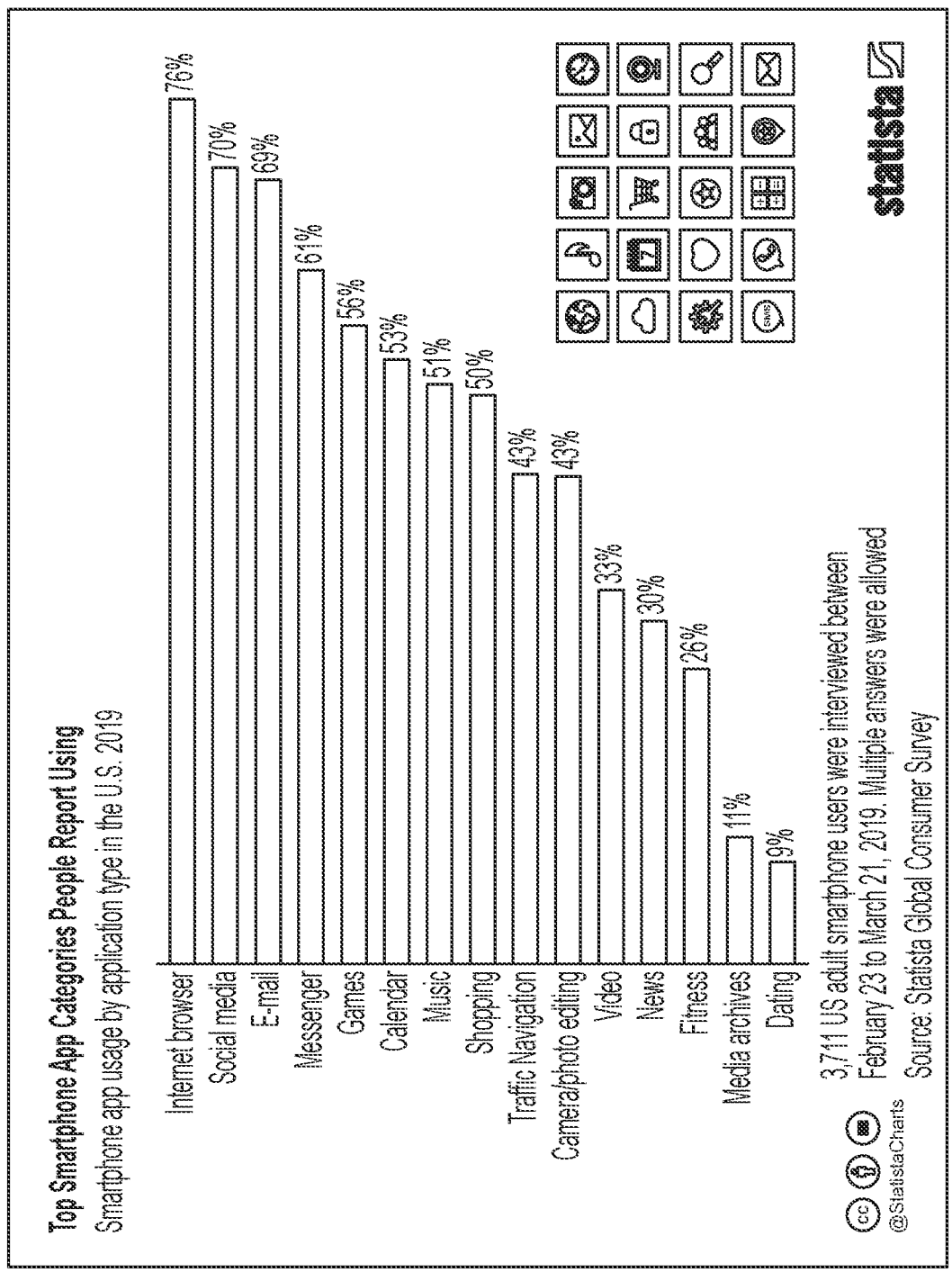
FIG. 3 shows top smartphone app categories.
Figure 4A:
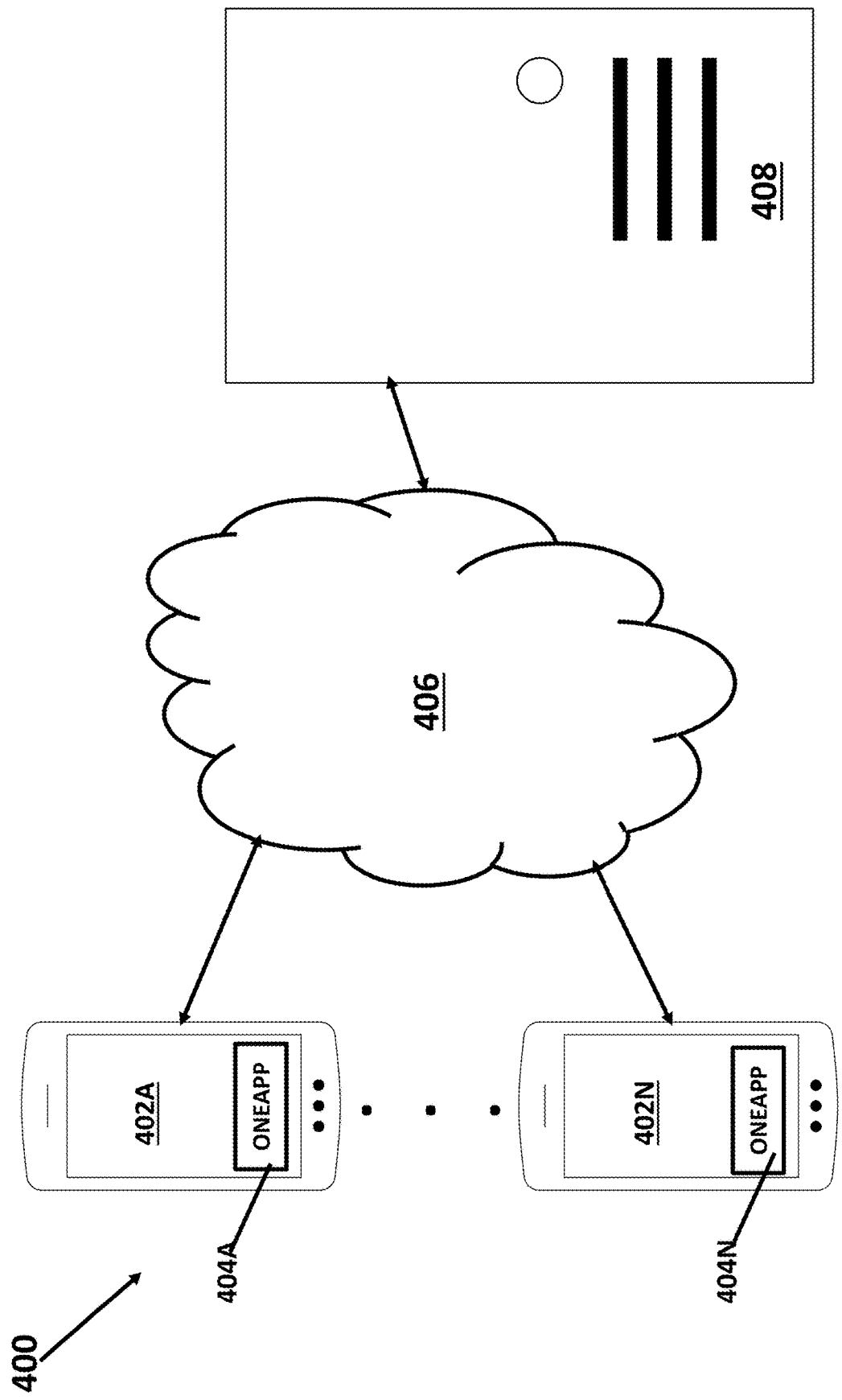
FIG. 4A illustrates an embodiment of a OneApp system.

FIG. 4A illustrates an embodiment of a oneapp system 400 that can provide the oneapp functionality discussed below. In this embodiment, the system 400 may be cloud based, but may also use any other computer system/network architecture that are all within the scope of the disclosure. The system 400 may have one or more computing devices 402A, . . . , 402N that are used by each user to access a plurality of different services of different brands, retailers, etc. with each computing device 402 using a OneApp 404, such as the oneapp 404A, . . . 404N for each of computing device 402A and 402N shown in the example in FIG. 4A. Each computing device 402 may be a processor based device that also have a display, memory and connectivity circuits to connect over a communication path 406 to the various digital services provided by the back end 408. For example, each computing device 402 may be a smartphone as shown in FIG. 4A, but may also be a tablet computer, a laptop computer, personal computer, appliance, set top box and the like. Each oneapp 404 may be a plurality of lines of computer code/instructions that are executed by the processor of the computing device to perform the OneApp functions and operations as detailed below.

Each computing device 402 may connect to a communication path 406, such as the internet, Ethernet, one or more wireless or wired networks, that in turn connects to a OneApp backend system 408 that provides OneApp functions and operations as detailed below. The backend system 408 may be one or more computing resources, such as server computers, cloud computing resources, etc. that have a processor that executes a plurality of lines of computer code/instructions so that the backend/processor are configured to provide the OneApp functions and operations. In operation, the OneApp 404 may generate a request that is sent through the communication path 406 to the backend 408 that then responds to that request in different ways and returns data and/or a user interface back to the computing device 402 to effectuate the OneApp operations discussed below.

For a user, the OneApp 404 may be downloaded from an application site, such as Play Store for an Android OS based device or the App Store for an iPhone device. The user may register by creating a profile on the app with verified user credentials. When the user initially uses the OneApp, there may be two scenarios for first-time users: 1) the user is at a particular place/physical store (place of interaction or PoI); or 2) the User is not at a place of interaction (PoI). In one implementation, the computing device 402 executing the OneApp may determine if the OneApp/computing device is at/near/adjacent a PoI because the particular PoI is geofenced, the computing device uses known GPS to determine if the OneApp/computing device is near/in/adjacent the PoI, the computing device detects a WiFi network or other network adjacent the PoI and/or the computing device 402 detects and connects the a network associated with the particular PoI for example.

Figure 4B:
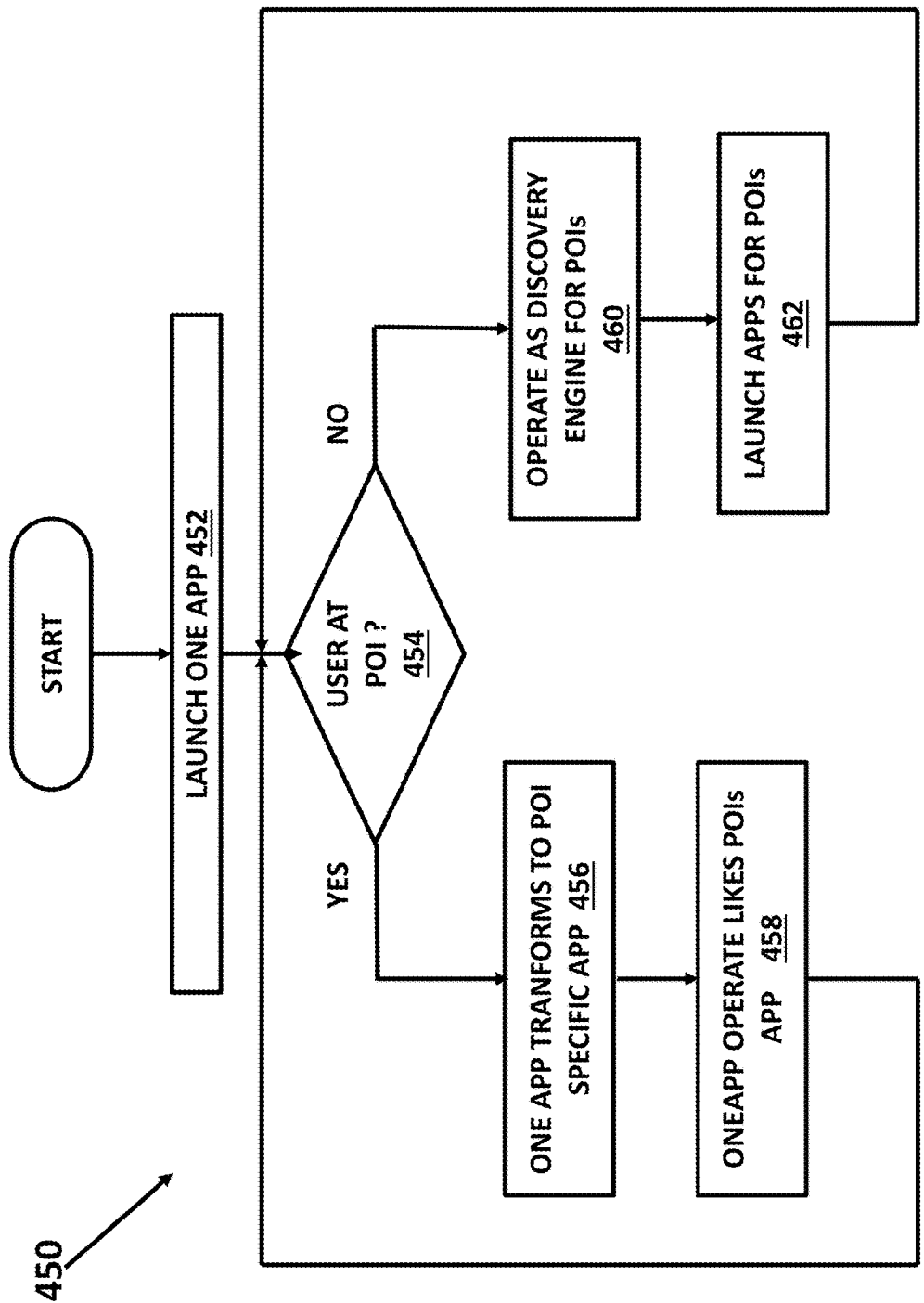
FIG. 4B illustrates a method for using the OneApp.

FIG. 4B illustrates a method 450 for using the OneApp by a user in which the user launches the Oneapp (452). Once launched, the OneApp/computing device 402 executing the OneApp determines if the user is in/adjacent/near a PoI (454) by various known methods. If the user is at a PoI, such as at a physical store, OneApp 404 transforms itself (456) into the app of that store. Users can then start using OneApp, as if it were the app of that store they are in (458). For example, OneApp would display content as curated by the store. Users can avail the in-store facilities the store chooses to offer through its app. For instance, if a user is at Starbucks: 1) they can view the Starbucks menu, store timing, ongoing offers, etc.; 2) they can access their Starbucks profile, including the loyalty program, available rewards, etc., which are seamlessly synced (if a persistent user identity is created); and/or 3) they can use the app to place in-store orders and make payments (if the functionality is enabled by Starbucks and supported by the franchise-store).

If the user is not at any point of interaction, the OneApp 404 acts as a hyperlocal discovery engine for point of interactions (PoI) around the user (460). The user can browse and discover PoIs by: 1) use cases (Eat/Drink/Shop/Stay); 2) PoI category (Hotel/Mall/Theatre/Café/Restaurant/Club//Pharmacy); 3) distance (by closest from their location or search at a particular area or within a distance-range); and/or 4) user reviews and ratings, or a combination of the both. A user also can click on the logo of a particular PoI (462) to launch their app, even without being physically present at the store. They can access all the information curated by the store as well as avail themselves of various store-specific utilities. For example, the user can: 1) search for cafes within a 2-km radius to find a list of cafes; 2) filter the above list by "cafes that support table reservations"; 3) select a particular outlet of a cafe to launch the cafe's app; 4) view the menu of the cafe. The user can also view real-time food availability (if the functionality is enabled by the cafe and supported by the franchise-store); 5) view table availability (if the functionality is enabled by the cafe and supported by the franchise-store); and/or 6) reserve a table in which users can book tables and select their preferred seat.

As shown in FIG. 4B, the method loops back and periodically checks if the OneApp is at/adjacent/near the PoI (454). Each PoI may also interact with the OneApp. The OneApp may include an onboarding process in which each PoI has the following onboarding options: 1) the PoI enables its Website/progressive Web app (PWA) to work with One-App out of the box; 2) if the PoI has an existing mobile app, then the same app can be ported to OneApp; and 3) the PoI chooses to use the OneApp builder to create an app from scratch with the easy-to-use, fully modular, and customizable App Builder framework, which OneApp offers. This onboarding process creates the brand/store/PoI's app on OneApp.

Once a brand's app is created on OneApp: 1) the PoI gets full access to all user data on OneApp (filtered to each PoI). The PoI can also use OneApp's APIs to integrate various third-party services, for example, a User Management system, with the app; 2) the PoI gets full control of all its utilities and content that is being displayed on OneApp. As PoIs can integrate various third-party services, using OneApp's APIs—they can choose a preferred Content Management System to be integrated with their app; 3) the PoI gets access to an automated dashboard, which provides them detailed insights on consumption patterns, customer behavior, performance, etc. As the dashboard is modular and fully customizable, the PoI can tailor the dashboard to suit their requirements better; 4) the PoI gets hierarchical access-control to enable multiple stakeholders to view/edit their data and to add/edit/delete features and utilities; and/or 5) the PoI has the option to install hyperlocal attribution technology. Technologies like QR codes/NFC/BLE beacons/Wi-Fi can enable OneApp to transform into the brand's app more accurately, based on user-location.

The OneApp is a hyper-contextual app, which can transform itself into any app based on user context—the user's location (presence at a particular place/physical store); or entered search-inputs (user clicking on a POI logo/icon); or time based propensity (Specific App access based on time of day). The OneApp uses the backend/platform 408, in part, to deliver its operations and functions. The OneApp 404 is a Platform as a Service (PaaS) offering in which each point of interaction (PoI) can use OneApp to have it rendered into their own app and the app is then exposed to end users via various consumer interfaces, like mobile apps, progressive Webapps, and Websites. OneApp, as a platform, allows partners to enable features that they want to provide to their customers, e.g. remote order or e-commerce, loyalty & rewards, reservations, real-time inventory checks and on-site order placement, among others. OneApp offers partners the option to select from various third-party services for integrating these services with their app. Various third-party services are available on the OneApp platform, like, delivery partners, SMS providers, email services, etc.

The OneApp system may include a microservice-based modular backend framework consisting of "widgets" and a framework for any app category that can be built to include the pertinent functionality/features. Each widget represents a functionality/feature of an app category (some widgets may have overlapping usage across categories). Any PoI operating in the same category can use them. For example, "Menu" is a widget that can be used by a chain of restaurants as well as a standalone café in the F&B category. Each widget can be further customized in terms of UI/UX, template, structure, size, category, sections, etc. using a modular framework, keeping the underlying functionality constant. A brand can even request for a custom widget, which would appear on their dashboard once the same is built by the OneApp team. A brand's app on OneApp is a combination of widgets.

In the OneApp system, data in the backend 408 may be stored as per each Brand and each POI of the brand. Furthermore, the App framework including functionality, features, order in which widgets appear, UI elements, etc. are all specific to a Brand and POI. Thus, brand/PoI specific data may be stored at the backend and is not downloaded to the mobile device 402 for persistence. Instead the data is queried on demand and is served by the backend framework 408 with its APIs.

Using the dashboard provided, a brand can select a filter for: 1) the set of widgets that need to be rendered, when a user is at a PoI; and 2) the set of widgets that need to be rendered, when a user is not at a PoI. The lists can be identical or can have widgets arranged in different order of priority. Once a set of widgets is selected, the brand/PoI is required to add information and carry out necessary configurations, so that the widgets can be rendered in a way to fulfil their intended functionality on OneApp, before being exposed onto the consumer interfaces. The PoI can further define the order in which the widgets appear, using a dashboard. This order can be either pre-decided by the brand or intelligently populated based on consumer preference-led/personalization-led rules or AI/ML algorithms. In the system, the widgets based on hyperlocal discovery. In other words, the consumption and interaction of the user at that POI may be used to determine the widgets for that POI. This means that every POI will have a different set of widgets (rail population) and is not dependent on a central AI/ML logic.

Additionally, the brand can also customize the logo, UI/UX, templates, colors, structures, themes, animations, etc. for the various consumer interfaces to render a similar look-and-feel like their own app (if they already have one) and reflect their essence. For example, Cafe 1 has enabled digital menu and restaurant information whereby user entering the cafe can scan the QR code and see the restaurant menu and other information like reviews, seating capacity, cuisine type etc. For Café 2, in addition to showing digital menu and information, when the consumer scans the QR code or opens the restaurant page from the One App, the user also gets to reserve table and get confirmation of same. Additionally when in the restaurant user can order food digitally without having to call the waiter and give him the order. For Café 3, in addition to the user being able to view digital menu & information, plus reserve table and order food through digital menu while inside the cafe, the cafe can also offer loyalty program for its consumer, push dynamic offers basis user preference and behaviour and also set dynamic billing logic like every 3rd visit to the cafe applies a Rs 500 discount to the bill. The above example of three cafes shows that brands can opt for a different feature set of the many functionality which will be built for a business stream within the One app concept.

The OneApp System 400 and backend 408 may include various consumer interfaces including: consumer interfaces (apps/PWA/Web site) to interact with the OneApp platform, using APIs; the consumer interface that detects the user's context (user-context is a combination of location and proximity of the user to a PoI) when a user creates a new account or an existing user logs in to their account; and the consumer interface that detects with varying degree of accuracy whether a user is at a PoI, based on the user device's capabilities (GPS/Bluetooth/NFC/QR scanner/Wi-Fi) and hyperlocal attribution technology deployment (QR codes/BLE Beacons/Wi-Fi/NFC).

If the user is at a PoI, the consumer interface requests the app of that PoI to be populated from the OneApp platform.

If the user is not at a PoI, the consumer interface populates a list of PoIs located close to the user. User proximity is set as the default mode. On the consumer interface settings, users can sort/filter this list or even alter the logic. If the user's device doesn't support location/user proximity, the consumer interface provides a search prompt to either select a location on the map or a PoI to commence the user journey. The user has overriding control to switch between modes—either from being inside a PoI to discovery mode or from one brand app to another. The functionality available to a user on a PoI's app depends on the widgets enabled by that brand/PoI on the OneApp platform and whether the user is at the PoI (in-premise mode) or is accessing the brand app in Discovery mode. The information available to the user is based on the information listed by the PoI on the platform. This information is mapped to the framework defined in general for a PoI category, and can be made specific for a particular PoI.

The OneApp system 400 uses various mechanisms to transform into the app of the point of interaction (PoI) the user is at or around. The following mechanisms may be used to determine where a user is: 1) Beacons—Beacons are devices that emit Bluetooth signals with encoded information. These signals can be read by any Bluetooth-enabled device, like smartphones or smart watches. Beacons are installed at various public places, like railway stations, airports, retail outlets, and others—to relay information about the place. OneApp can read this information to transform itself into the app of a respective store or brand; 2) QR code-If a user scans the Quick Response (QR) code of the point of interaction (PoI) they are in, OneApp would capture the necessary information to transform itself into the app of that specific PoI; and/or 3) NFC—Using the Near Field Communication (NFC) technology of the PoI the user is in, OneApp would capture the necessary information to transform itself into the app of that specific PoI.

In order to register a user for the OneApp, the user provide certain information. For example, the name of the user and his or her phone number are the two pieces of user information for registration. The verification is done via sending a one time password (OTP) on the user's mobile phone. These two information apart, few other information, like the email ID of the user, their gender, DoB, and similar other identity-related information may be required for certain PoIs on a case-to-case basis.

The OneApp system 400 may include a mechanism to transform into a hyperlocal discovery engine. For example, the OneApp suggests surrounding points of interaction (PoI)s based on: 1) user location (GPS of the computing device)—Depending on the location of the user, OneApp determines the PoIs that are present in their surroundings. Users must permit OneApp to use their location; and/or 2) user behavior-Analyzing a user's historical data, OneApp suggests PoIs that are more aligned to a user's interests, behavior, and other consumption patterns.

The OneApp system 400 may include a mechanism (APIs) for integrating third-party utilities. In particular, OneApp offers two options for integrating third party apps which are: 1) an Admin panel-OneApp provides an Admin panel through which PoIs can add necessary plug-ins from the list of built-in plug-ins for third-party integration. The Admin panel is the only option for PoIs that opt for OneApp's basic subscription; and/or 2) access to REST APIs—PoIs that opt for premium subscription receive access to OneApp's REST APIs, too. PoIs can use these APIs to custom build their app in the way they want. They can integrate their app with any of their preferred third-party utilities, which are available in the market, using OneApp's REST APIs. They can choose from wider options and can select the third-party service that best suits their requirements, from the ones available in the market.

The OneApp system 400 may include a microservice-based modular backend framework. Widgets are UI components that are built to carry out specific functions. The widgets offered by OneApp can be categorized into widgets meant for End-users and App-partner users.

Figure 5:
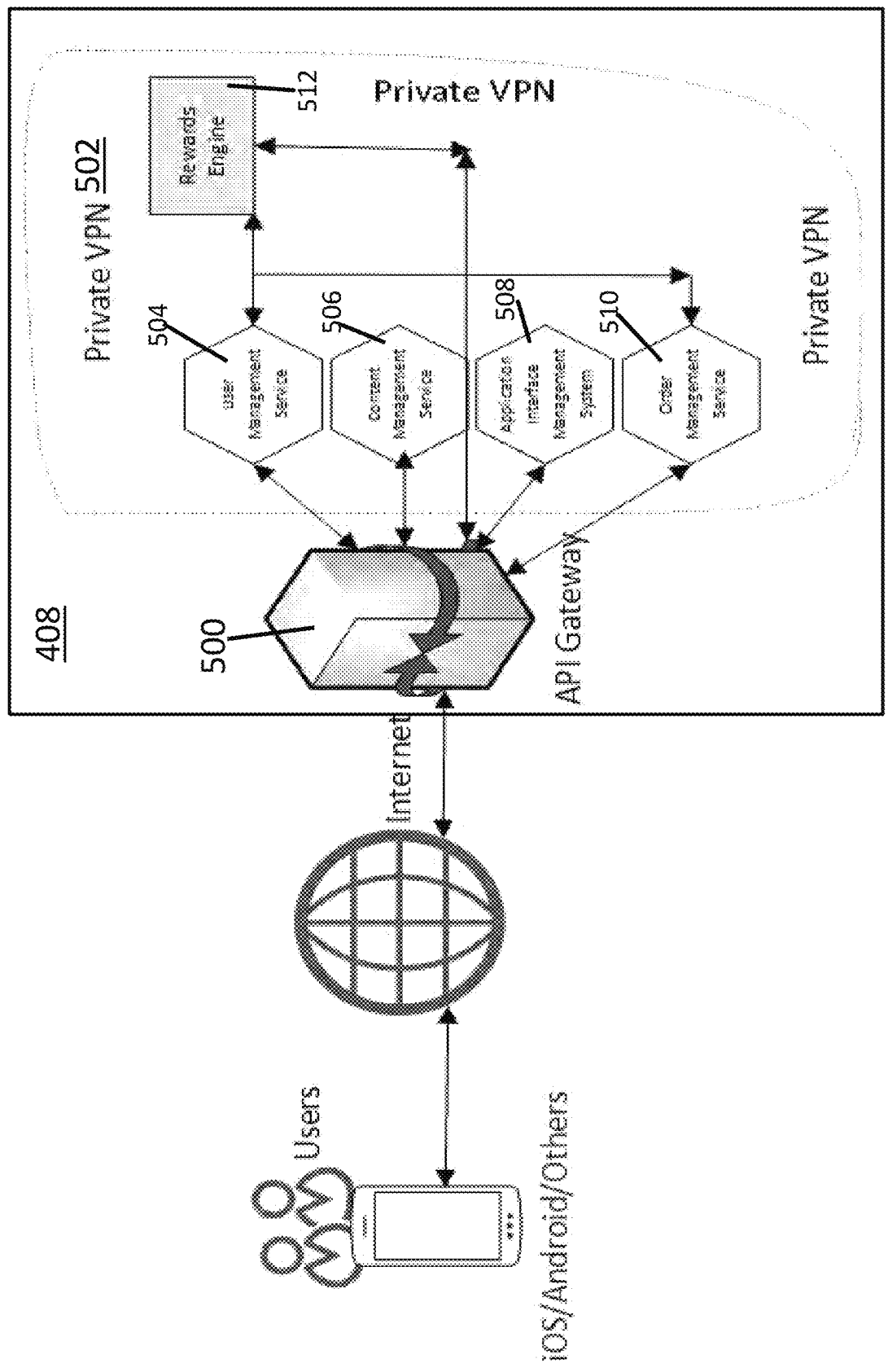
FIG. 5 illustrates the OneApp system from a user perspective.
Figure 6:
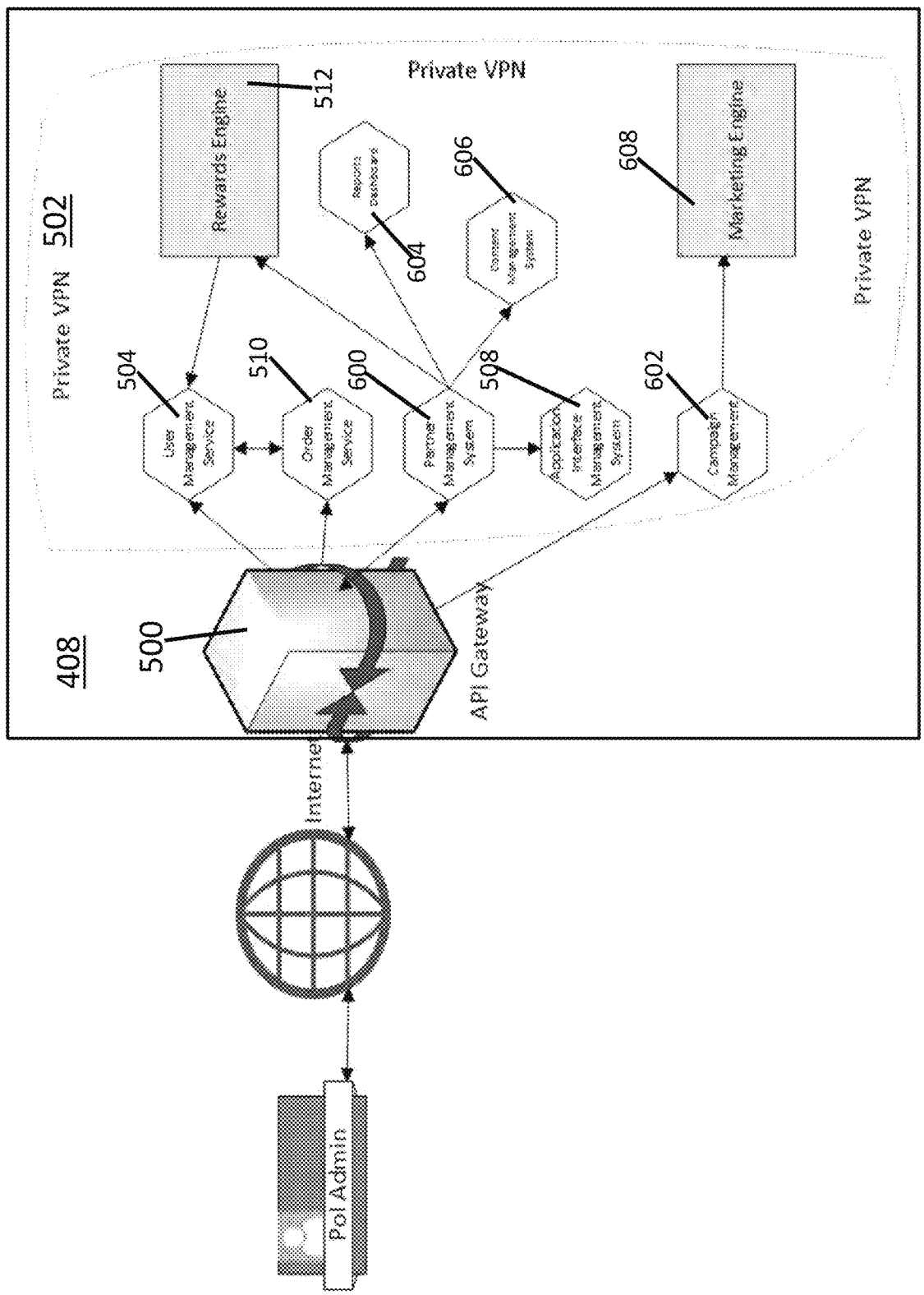
FIG. 6 illustrates the OneApp system from a store owner/brand partner perspective.

FIG. 5 shows more details of the OneApp platform 408 from a user perspective. As shown in FIG. 4A, the platform 408 may include an API gateway 500 that access resources using a private VPN 502. The services/functions may include user management services 504, content management services 506, application interface management services 508 and order management services 510. Some of those services connect to a rewards engine 512. FIG. 6 shows more details of the OneApp platform 408 app-partner perspective that may share some of the elements (App gateway 500, user management services 504, order management system 510, application interface management system 508 and rewards system 512) as shown in FIG. 5. The app-partner may also be able to access other elements/services including a partner management system 600, a campaign management system 602, a reports dashboard 604, a content management system 606 and a marketing engine 608.

The API gateway 500 is responsible for connecting clients to various backend services and returning a result to them. API gateway makes sure that only authenticated and authorized users can access resources. It also handles service discovery, throttling, and rate-limiting for various services. The user management system 504 is responsible for managing the users of all partners and allowing partners to share user information, subject to the consent of the individual user. UMS has various types of users, like end-users and App partner-users of varying roles. This system is responsible for user registration, login, and authentication.

The application interface management system 508 allows partners to design the look and feel of their apps. This allows partners to create pages on the app that reflect the essence of their brand and manage the content arrangement. It allows partners to select specific design templates for various activities. It is accessed via partner dashboard, and end-users can directly access this system. AIMS decides how content is visible to the users, whereas CMS decides what is visible to the user.

Examples of the design choices can be

Change of app background colour matching the brand colour when the user is inside the brand specific store page.

Change in the CTA colour matching the brand attributes.

Customization of brand communication in form of email, push notification incorporating the brand colour, logo and brand language.

The reward engine 512 allow PoIs to design reward programs for their customers. The Reward engine also is responsible for rewarding consumers. It allows partners to set up various rules via the partner dashboard. The Partner management system 600 is used for onboarding partners onto the OneApp ecosystem. This allows partners to select features and various plans from the ones available on OneApp. They can decide what information they want to capture from users and what they want to share with other partners. It allows them to decide the delivery mode or payment partner to use and select their preferred vendors for marketing capabilities via e-mail and SMS.

The content management system (CMS) 606 is responsible for allowing partners to add various types of content to the system to be shown to end-users with the help of AIMS 508. Partners can add menus, products, services, offers, blogs, etc. CMS allows them to add content in various forms like text, audio, video, images, HTML, etc. The Reporting engine 604 generates various types of reports for partners. The data to create these reports are fetched from OMS 510 and UMS 504. Partners can view sales figures, the rewards programs and rewards redeemed, the new users onboarded, etc. The Order management system 510 allows taking orders from customers regardless of whether they are using the app at the PoI or from any other place. The campaign management system 602 allows partners to run various campaigns for customers. The OneApp dashboard allows them to create various segments of users and run different campaigns for each segment. It gives them the capability to reach out to potential customers via Email, SMS, local In-app messaging, and push notifications. Using the OneApp system, campaigns can be created on the basis of previous actions done by the user on the One App ecosystem. For example, If a user in a restaurant had always ordered dessert after meal then, through customization of the campaign for this customer, an offer of a free dessert may be added on the order. The Marketing engine 608 provide features to reach out to end consumers via the following ways including E-mail, SMS, Notification and/or In-App messaging.

Examples of OneApp User Interfaces and Flow

Figure 8:
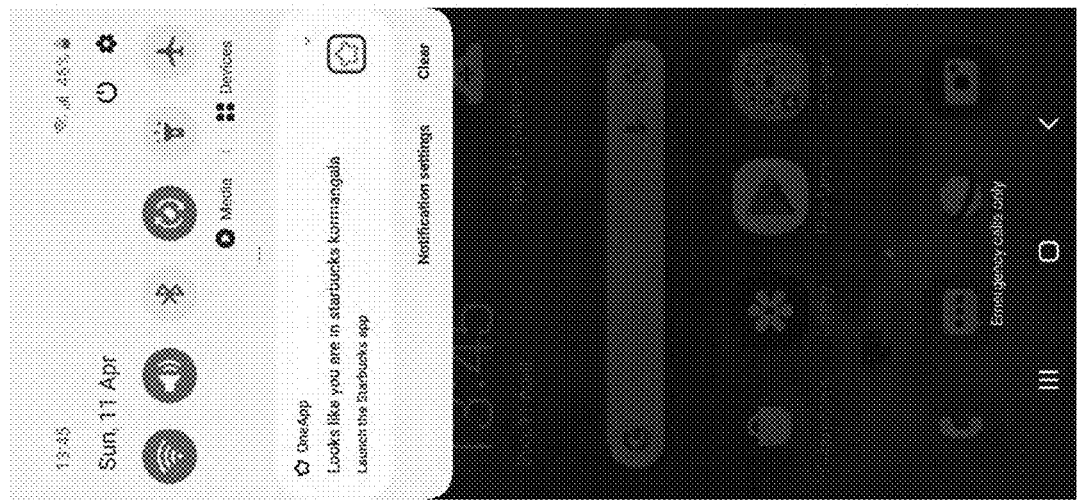
FIG. 8 illustrates an example of a notification from the OneApp.
Figure 7:
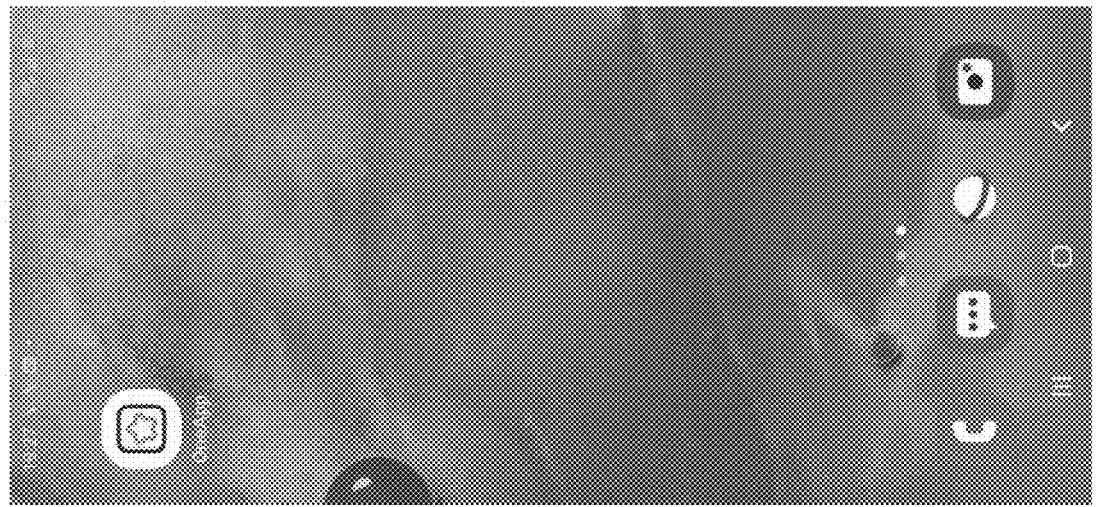
FIG. 7 illustrates an example of a computing device having the OneApp icon.

FIGS. 7-11B illustrates an exemplary OneApp, its user interfaces and its operations and transitions between brands as the user in using the OneApp on their computing device 402. For example, FIG. 7 illustrates an example of a computing device having the OneApp icon while FIG. 8 illustrates an example of a notification from the OneApp when the OneApp (due to location services in the computing device 402 or GPS) identifies that the user is in a location of a brand, such as Starbucks® in this example, and provides the user the option to launch Starbucks app inside of the OneApp. Thus, FIG. 8 shows one way that the OneApp may initiate a user interaction with the OneApp when the OneApp is not being actively used by the user.

Figures 9A, 9B:
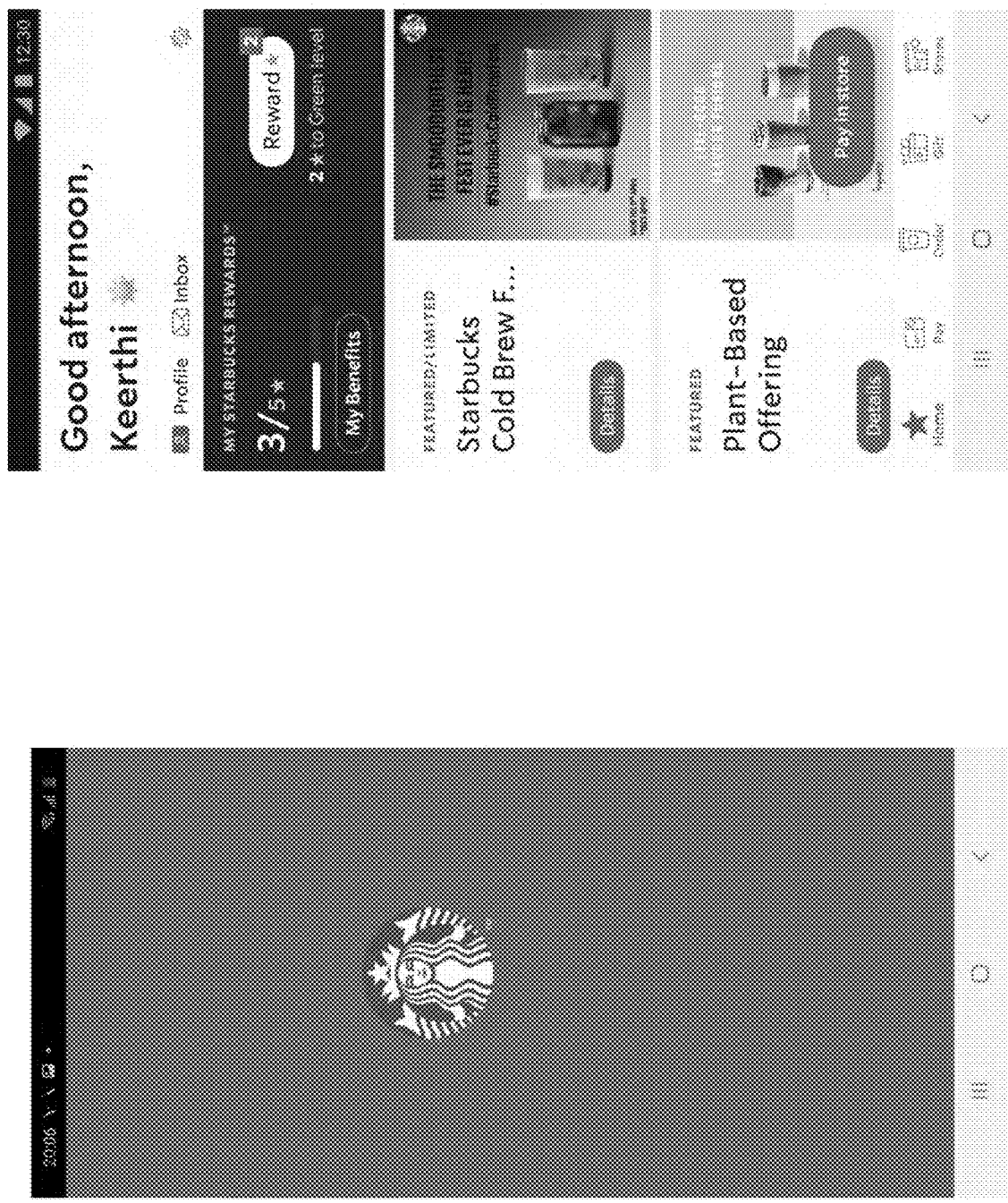
FIGS. 9A-9C illustrate an example of a Starbucks user interface in the OneApp.
Figure 9C:
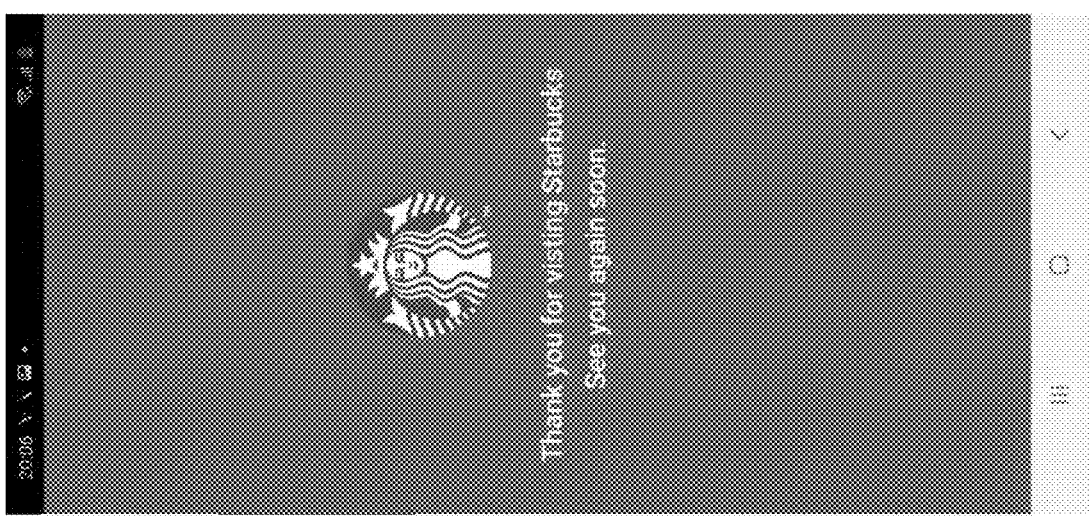

FIGS. 9A-9C illustrate an example of a Starbucks user interface in the OneApp with FIG. 9A showing the initial screen and FIG. 9B shows the user interface presented to the user when the use is in/near the Starbucks. Note that this user interface is customized to each user so that it, for example, shown the rewards for that user as shown in FIG. 9B. In this example, the user interface allows the user to pay for items, order/pre-order items, select and send gifts and find other stores, but each user interface for each brand/store may be different. FIG. 9C shows the screen when the user has left the store.

Figure 10A:
FIGS. 10A-10C illustrate an example of a location user interface of the OneApp.
Figure 10C:
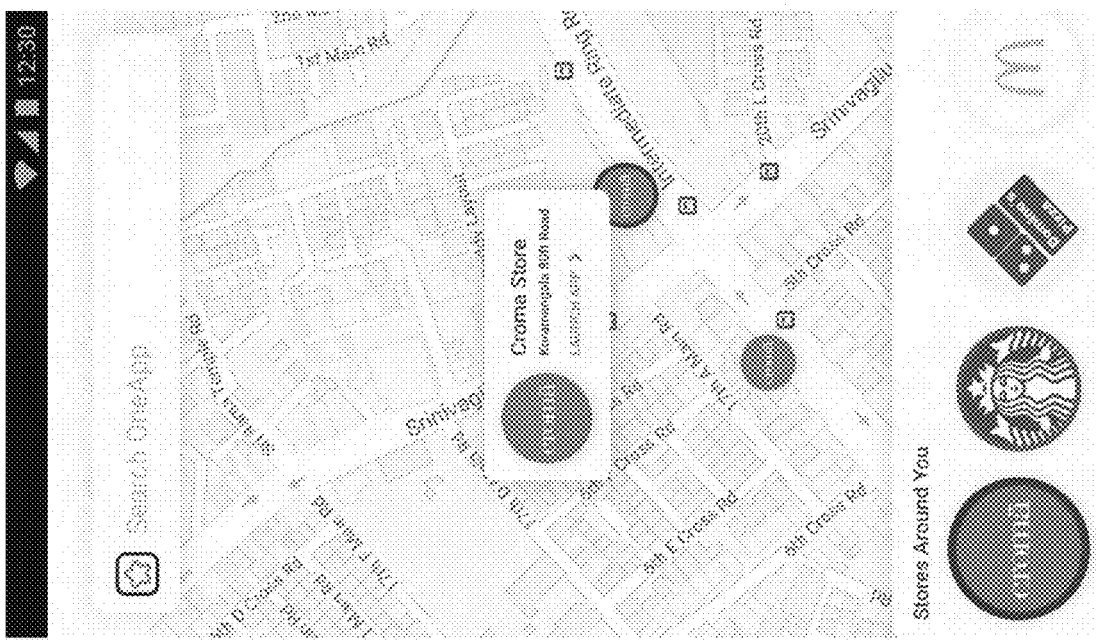
Figure 10B:
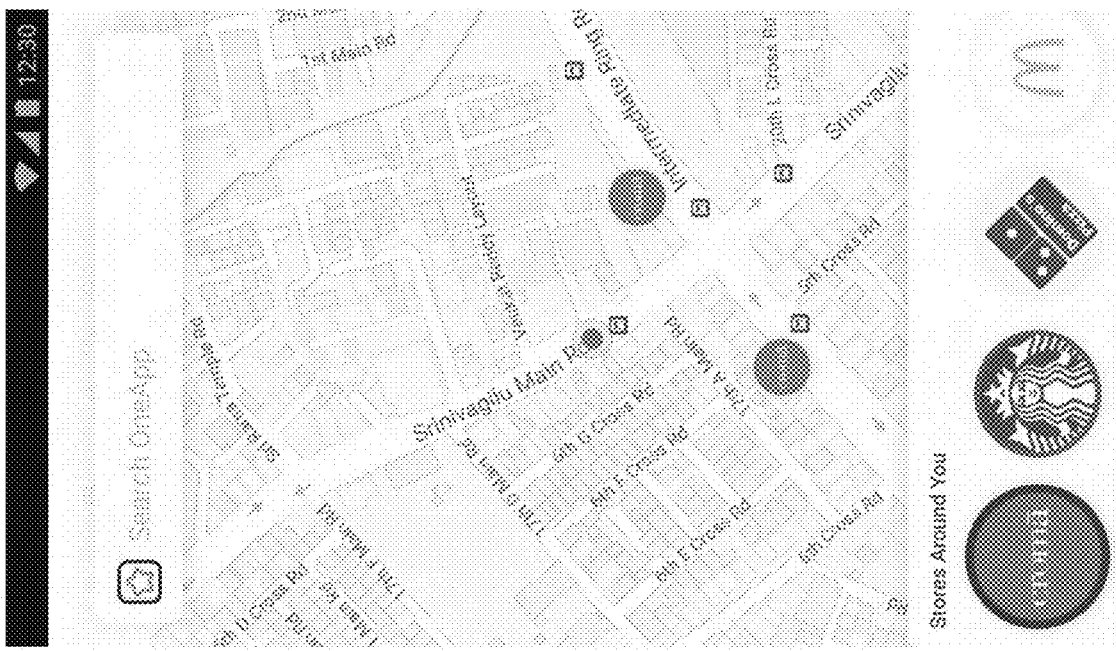

FIGS. 10A-10C illustrate an example of a location user interface of the OneApp. In the location user interface in FIG. 10A, a map is presented that shows the user's location (a green dot in this example) and location(s) of stores/brands near the user. In one example, each store's logo may be displayed to the user as shown in FIG. 10A. FIG. 10B shows the user interface when the user selects a logo (croma in this example) and the stores for the brand are shown bigger. FIG. 10C shows how the map interface then allows the user to select one of the stores for more information.

Figure 11B:
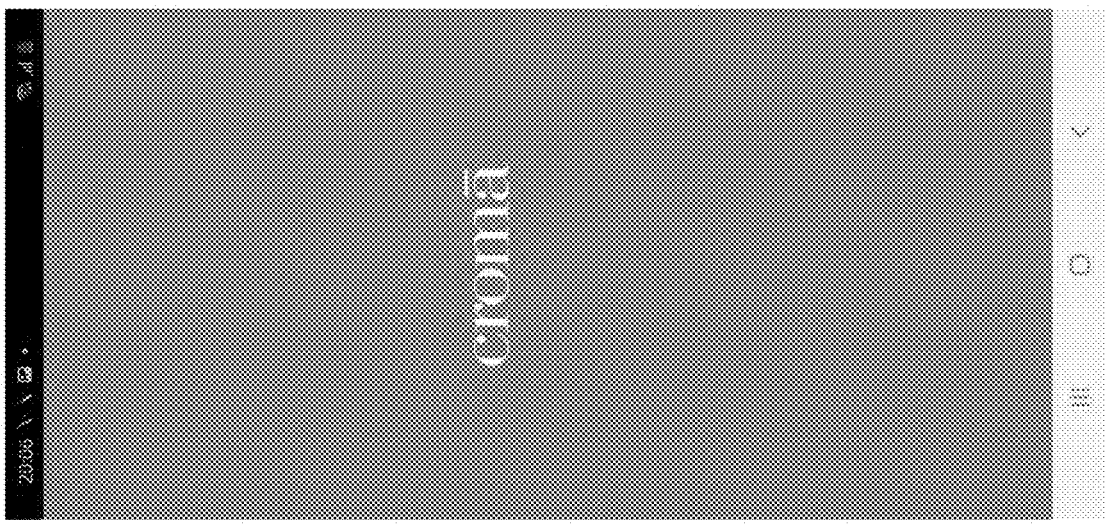
FIGS. 11A and 11B illustrates an example of a Croma user interface in the OneApp.
Figure 11A:
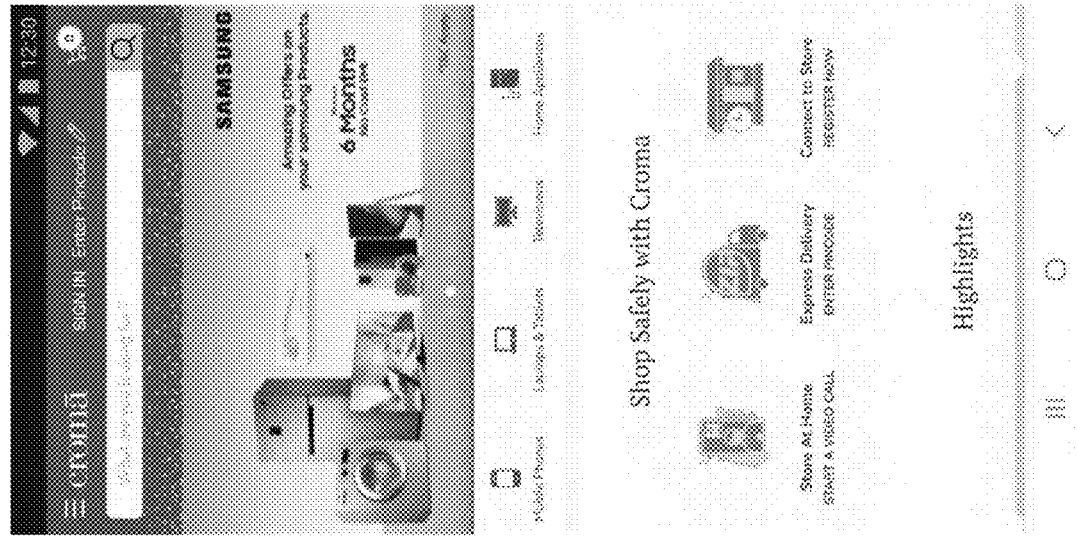

FIGS. 11A and 11B illustrates an example of a Croma user interface in the OneApp. Note that this user interface is different from the earlier user interface so that the OneApp allows the user interface for each brand to be customized even though all of the user interfaces are being presented in the OneApp. FIG. 11A shown a home screen user interface while FIG. 11B shows the user interface while the user is adjacent/near/in the croma store and provides the user with different options to interact with the store.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A system, comprising:
 a computing device of a user having a processor; a memory and a OneApp stored in the memory and comprising a plurality of lines of instructions executed by the processor to configure the computing device;

a OneApp platform computer system having a processor and comprising a plurality of lines of instructions executed by the processor to configure the OneApp platform computer system, the OneApp platform computer system being connectable to the user computing device and being configured to design, by an application interface management system of the OneApp platform computer system, a branded user interface of the place of interaction (PoI) specific App for a brand owner displayed in the OneApp, to take orders, by an order management system of the OneApp platform computer system for the brand owner, of a user using the OneApp and the branded user interface of the PoI specific App at both a PoI and any other place, and to store a plurality of branded user interface of the PoI specific Apps associated with each PoI for each brand owner, each PoI specific App having the branded user interface of the specific PoI with content curated by the specific PoI and an offer to use in-store facilities of the specific PoI;

the user computing device being configured to identify a user action on the computing device that indicates an interest in a PoI and to request the PoI specific App for the particular PoI from the OneApp platform computer system;

the OneApp platform computer system being configured to download, in response to the request from the user computing device, the branded user interface of the PoI specific App for the particular PoI; and the user computing device being configured to transform, in response to the user action, the OneApp stored on the computing device into the PoI specific App, wherein the branded user interface of the PoI specific App for the particular PoI is displayed on the OneApp and configured to deliver the PoI curated content from the brand owner for the particular PoI, use of the particular PoI in-store facilities on the user computing device, to accept orders from the user for a product of the brand owner at the PoI and at any other place and to generate and display, on a display of the computing device, the PoI branded user interface of the brand owner for the particular PoI on the OneApp.

2. The system of claim 1, wherein the user computing device is further configured to identify a second user action on the user computing device that indicates an interest in a different PoI and transform, in response to the user action on the user computing device, the OneApp stored on the user computing device into a different PoI specific App, downloaded from the OneApp platform computer system, that delivers different PoI specific content and offers to the user computing device.

3. The system of claim 2, wherein the user computing device is further configured to determine the location of the user computing device adjacent to the particular PoI to identify the user action.

4. The system of claim 3, wherein the user computing device is further configured to receive a signal from a bluetooth low energy (BLE) beacon to determine the location of the user computing device, to scan a QR code to determine the location of the user computing device, or to receive a near field communication (NFC) signal to determine the location of the user computing device.

5. The system of claim 2, wherein the user computing device is further configured to perform a search for the different PoI to indicate an interest in the different PoI.

6. The system of claim 1, wherein the user computing device is further configured to perform hyperlocal discovery, by the OneApp executed on the computing device, to suggest one or more adjacent PoIs to the user.

7. The system of claim 6, wherein the user computing device is further configured to perform the hyperlocal discovery based on a location of the computing device to suggest the one or more adjacent PoIs to the user.

8. The system of claim 6, wherein the user computing device is further configured to perform the hyperlocal discovery based on a behavior of the user to suggest the one or more adjacent PoIs to the user.

9. The system of claim 1, wherein the PoI is one of a retail store and a brand.

10. The system of claim 1, wherein the OneApp is a progressive web app.

11. A method, comprising:

providing a OneApp platform computer system that supports a OneApp app that has been downloaded to each computing device of each user, the OneApp app being executed by a processor of the computing device;

designing, using an application interface management system of the OneApp platform computer system, a branded user interface of the place of interaction (PoI) specific App for a brand owner displayed in the OneApp;

taking orders, by an order management system of the OneApp platform computer system for the brand owner, of a user using the OneApp and the branded user interface of the PoI specific App at both a PoI and any other place;

storing, on the OneApp platform computer system, a plurality of branded user interface of the PoI specific Apps associated with each PoI for each brand owner, each PoI specific App having the branded user interface of the specific PoI with content curated by the specific PoI and an offer to use in-store facilities of the specific PoI;

identifying a user action on the computing device that indicates an interest in a particular PoI;

requesting, based on the user action on the computing device, the PoI specific App for the particular PoI from the OneApp platform computer system;

downloading, by the OneApp platform computer system in response to the request from the computing device, the branded user interface of the PoI specific App for the particular PoI;

transforming the OneApp stored on the computing device into the PoI specific App, wherein the branded user interface of the PoI specific App for the particular PoI is displayed on the OneApp and delivers the PoI curated content from the brand owner for the particular PoI, and use of the particular PoI in-store facilities on the computing device; and receiving orders, using the PoI branded user interface of the brand owner for the particular PoI on the OneApp, from the user for a product of the brand owner at the PoI and at any other place.

12. The method of claim 11 further comprising identifying a second user action on the computing device that indicates an interest in a different PoI and transforming, in response to the user action on the computing device, the OneApp stored on the computing device into a different PoI specific App, downloaded from the OneApp platform computer system, that delivers different PoI specific content and offers to the computing device.

13. The method of claim 12, wherein identifying the user action further comprises determining the location of the computing device adjacent to the particular PoI.

14. The method of claim 13, wherein determining the location of the computing device further comprises one of using a bluetooth low energy (BLE) beacon, scanning a QR code, or using a near field communication (NFC) signal.

15. The method of claim 12, wherein identifying the user action further comprises performing a search for the different PoI.

16. The method of claim 11 further comprising performing hyperlocal discovery, by the OneApp executed on the computing device, to suggest one or more adjacent PoIs to the user.

17. The method of claim 16, wherein performing the hyperlocal discovery further comprises performing the hyperlocal discovery based on a location of the computing device to suggest the one or more adjacent PoIs to the user.

18. The method of claim 16, wherein performing the hyperlocal discovery further comprises performing the hyperlocal discovery based on a behavior of the user to suggest the one or more adjacent PoIs to the user.

19. The method of claim 11, wherein the PoI is one of a retail store and a brand.

20. The method of claim 11, wherein the OneApp is a progressive web app.

21. The system of claim 1, wherein the processor of the computing device is further configured to display, on the display of the computing device when the interest in the PoI is not detected and the user interface of the PoI specific App is not displayed, a hyperlocal discovery to browse a plurality of points of interaction.

22. The method of claim 11 further comprising displaying, on the display of the computing device when the interest in the PoI is not detected and the user interface of the PoI specific App is not displayed, a hyperlocal discovery to browse a plurality of points of interaction.

* * * * *